Dec. 2, 1924.
J. H. ROBERTS
GLUING DEVICE FOR TIRE WRAPPING MACHINES
Filed March 31, 1920     5 Sheets-Sheet 1
1,518,121
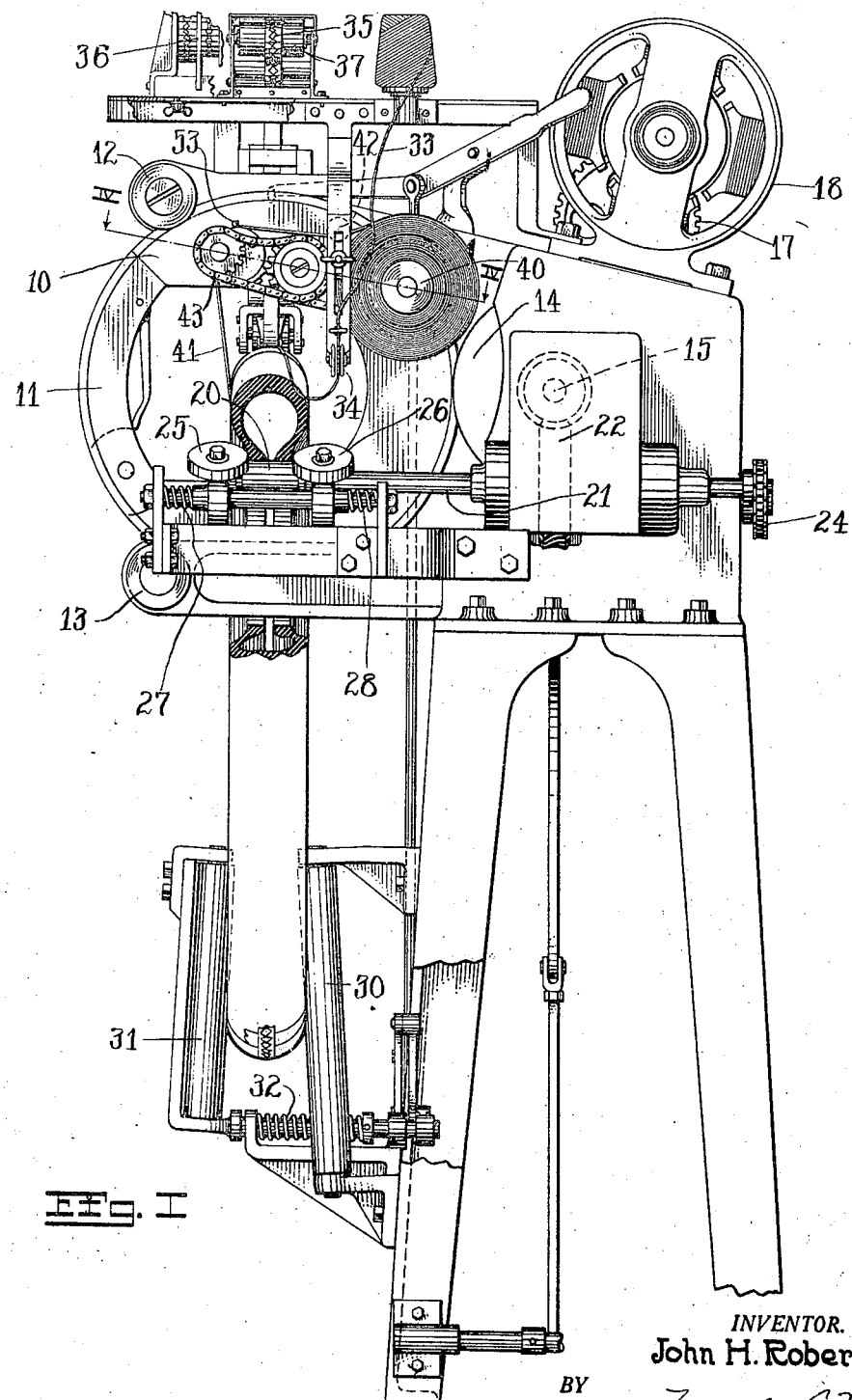
Fig. I
INVENTOR.
John H. Roberts
BY
Franklin G. Neal
ATTORNEY Dec. 2, 1924.                                                    1,518,121
J. H. ROBERTS
GLUING DEVICE FOR TIRE WRAPPING MACHINES
Filed March 31, 1920        5 Sheets-Sheet 2
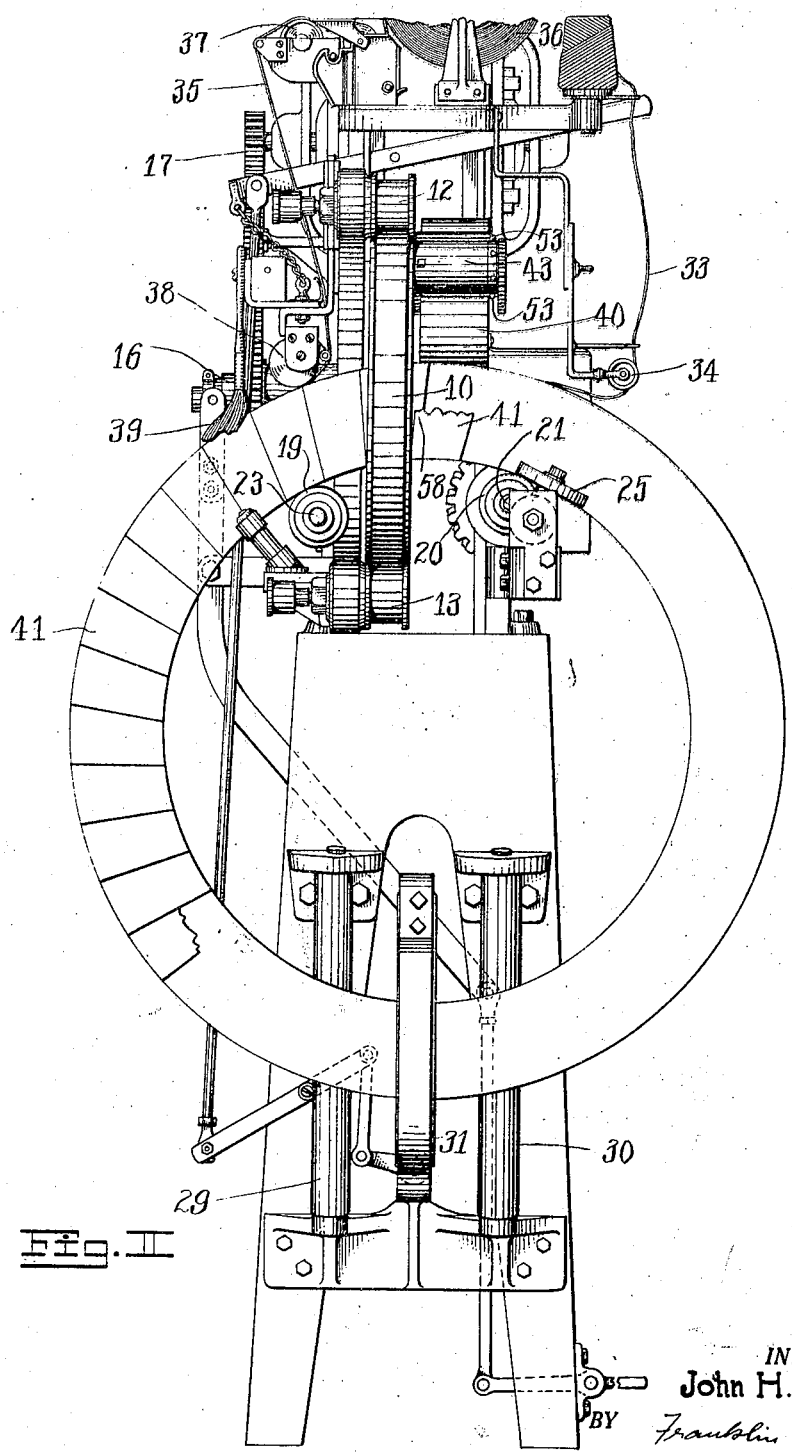
Fig. II
INVENTOR.
John H. Roberts
BY Franklin G. Neal
ATTORNEY Dec. 2, 1924.
J. H. ROBERTS
1,518,121
GLUING DEVICE FOR TIRE WRAPPING MACHINES
Filed March 31, 1920     5 Sheets-Sheet 3
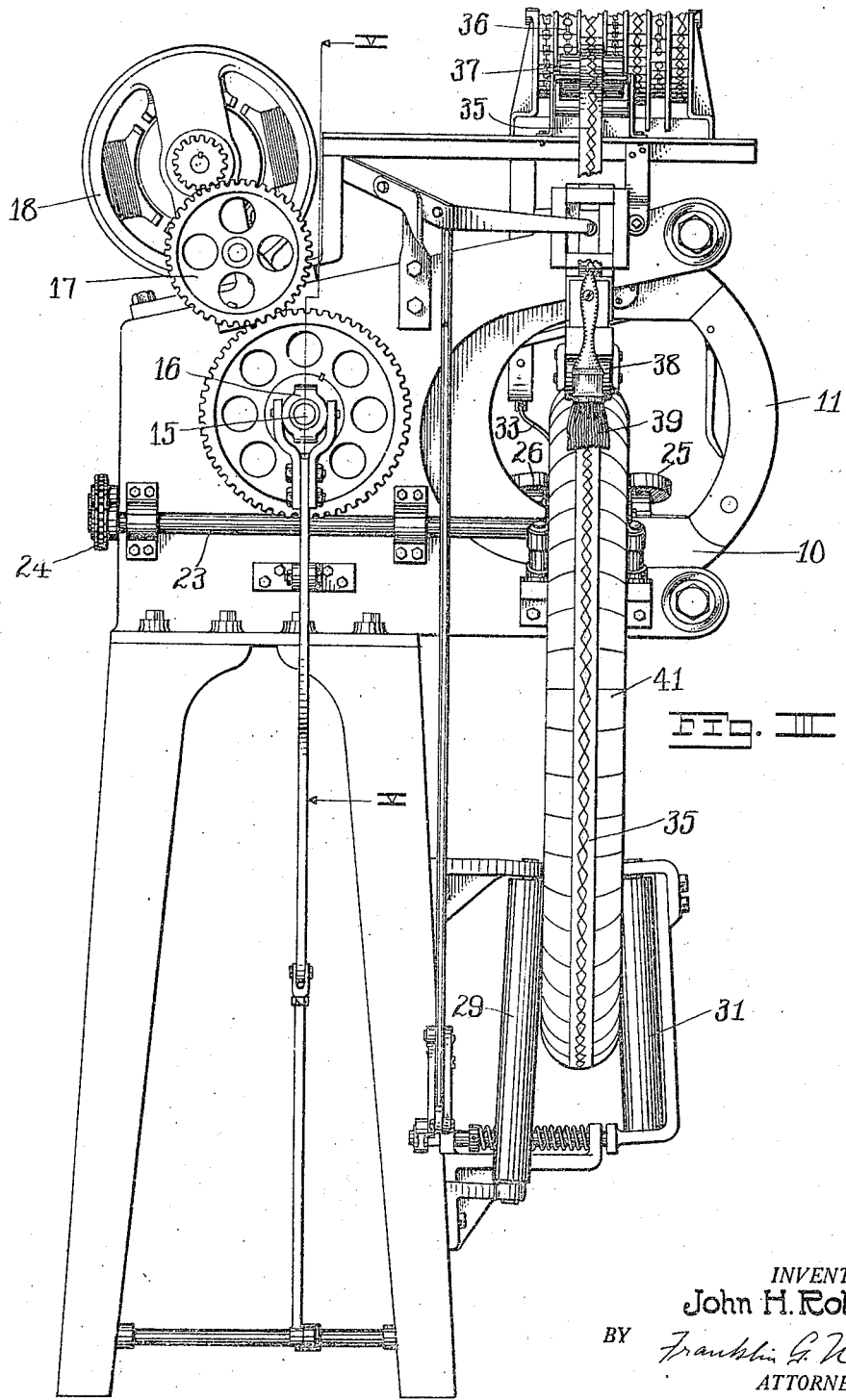
FIG. III
INVENTOR.
John H. Roberts
BY Franklin G. Neal
ATTORNEY

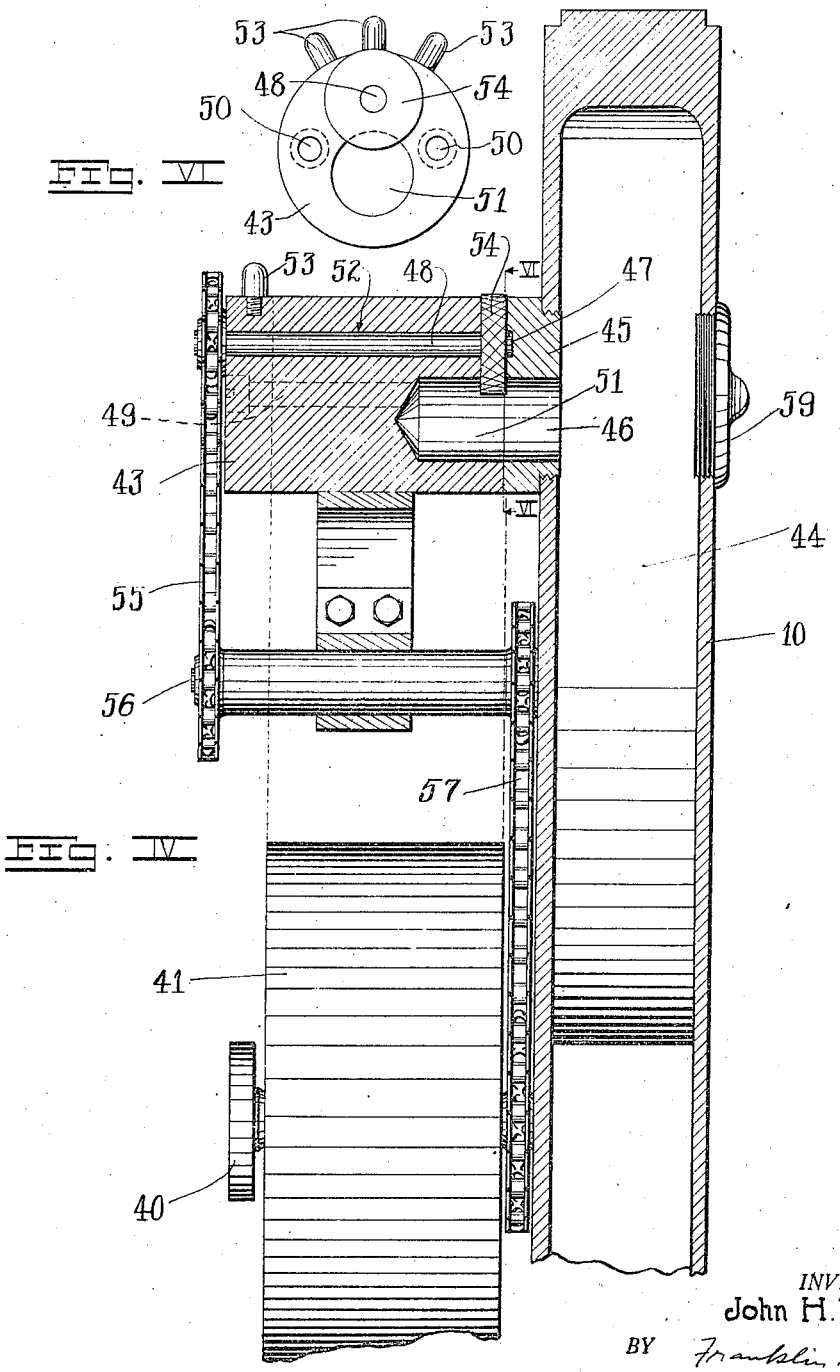

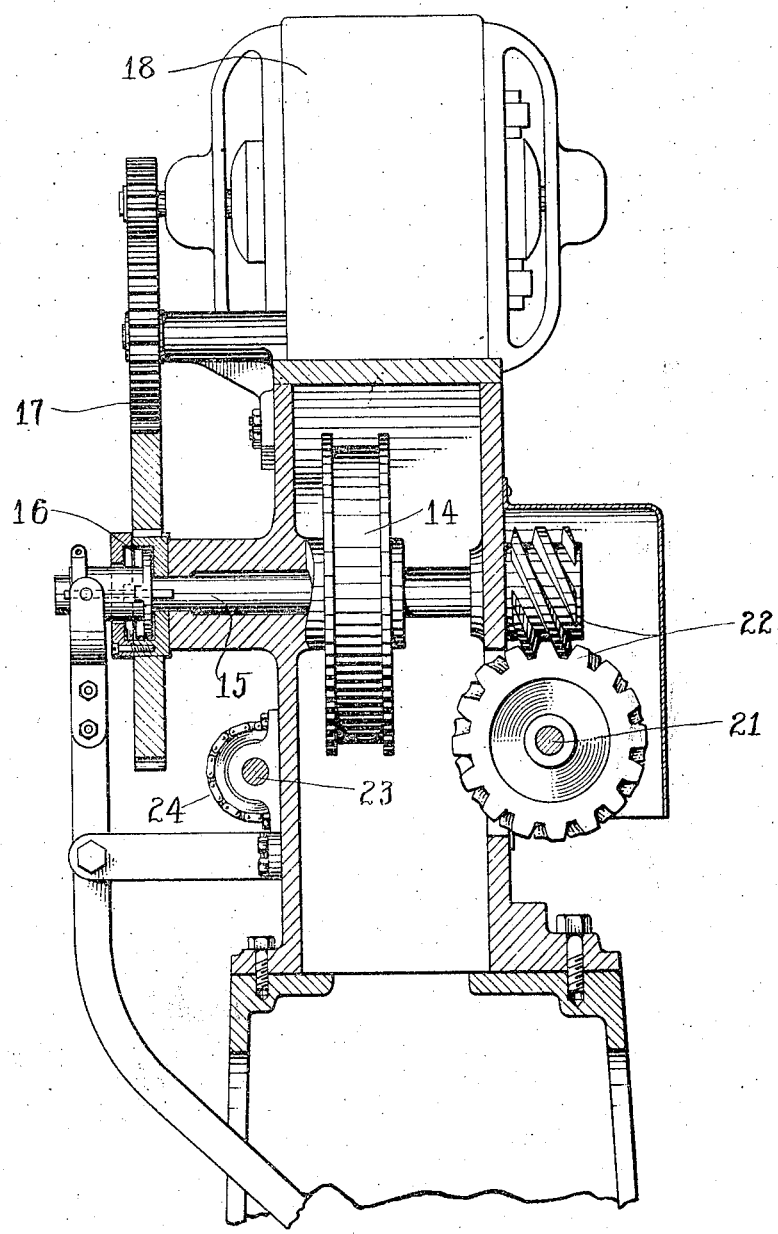

Patented Dec. 2, 1924.

1,518,121

UNITED STATES PATENT OFFICE.

JOHN H. ROBERTS, OF MILWAUKEE, WISCONSIN, ASSIGNOR, BY MESNE ASSIGNMENTS, TO THE FISK RUBBER COMPANY, OF CHICOPEE FALLS, MASSACHUSETTS, A CORPORATION OF MASSACHUSETTS.

GLUING DEVICE FOR TIRE-WRAPPING MACHINES.

Application filed March 31, 1920. Serial No. 370,315.

*To all whom it may concern:*

Be it known that I, JOHN H. ROBERTS, residing at Milwaukee, county of Milwaukee, State of Wisconsin, have invented certain new and useful Improvements in a Gluing Device for Tire-Wrapping Machines, of which I declare the following to be a full, clear, and exact description.

My present invention relates to a device for applying glue to the strip of paper with which automobile tire casings are wrapped helically.

It has for its object the improvement of existing machines for wrapping tire casings by the provision of means for applying glue to one edge of the strip of paper. It has for a further object a gluing device which is self-contained and presents no outstanding parts which will interfere with the operation of the machine. It has other and further objects relating to constructional and operating advantages which will appear from the ensuing description and the appended claims.

My invention will now be described in connection with the accompanying drawings, in which—

Fig. 1 is a front elevation of the machine;
Fig. 2 is a side elevation thereof;
Fig. 3 is a rear elevation thereof;
Fig. 4 is a section on an enlarged scale, taken on line 4—4 of Fig. 1 and showing the gluing mechanism in detail;
Fig. 5 is a section on line 5—5 of Fig. 3; and
Fig. 6 is a section on line 6—6 of Fig. 4, showing the paper guide and gluing device.

A general description of the machine as a whole will first be given. The wrapping mechanism is centered about a circular shuttle 10 having a hinged section 11 to permit of the insertion and removal of a tire casing. The shuttle is supported for rotation by guide rollers 12 and 13, and is driven by contact with a roller 14 on a shaft 15 connected by clutch 16 and gearing 17 with a motor 18.

The tire casing is supported in position to be wrapped by guide rolls 19 and 20, the latter of which is driven through shaft 21 and gearing 22 from shaft 15. Roll 19 is mounted on a shaft 23 which is driven from shaft 21 by a chain 24 and suitable sprockets. In order to press the beads of the tire inwardly while the wrapping is being applied rolls 25 and 26 are suitably mounted, being preferably pressed towards the beads by springs 27 and 28. To support the tire at its bottom and to further compress the sides of the tire rolls 29, 30 and 31 are provided, one of them, as 31, being preferably pressed towards the tire by a spring 32.

As auxiliary devices to the wrapping mechanism about to be described a string 33 may be led through a guide 34, and directed in position to be enclosed by the spiral wrapping, forming a convenient means of cutting the wrapper from the tire; and a gummed strip 35 may be fed from a supply 36, over a moistening device 37, and may be pressed against the outer circumference of the casing over the spiral wrapping by a roll 38 and a brush 39. These mechanisms may be used or not as desired, and form no part of my present invention.

My invention is directed to the provision of mechanism for applying adhesive to the inside of the spiral wrapping before the latter is applied to the tire. The wrapping mechanism consists in the annular shuttle 10 described above, a spool 40 of paper 41, and guides 42 and 43, around which the paper is led so that a suitable tension is imparted thereto, the spool and guides being mounted on the shuttle and rotating therewith. The construction of guide 43 is preferably as follows: Into shuttle 10, which at this point is chambered as at 44 to provide a receptacle for suitable adhesive, is secured a member 45 having an opening 46 therein connected with chamber 44, and providing a bearing 47 for the end of a shaft 48. Guide 43 is secured to the member 45 as by bolts 49 passing through holes 50 in the guide and being screwed into member 45. Guide 43 has a short hole 51 registering with opening 46, and provides a bearing 52 for shaft 48. Short pins 53 disposed on the circumference of the guide serve to direct the edge of the paper. Shaft 48 carries a small wheel 54, preferably knurled, which carries adhesive from hole 51 into contact with the inside edge of the strip of paper; and is driven by a chain 55 from a shaft 56. This shaft is driven by a chain 57 from a sprocket on spool 40 carrying the paper. As the paper is unwound from the spool wheel 54 will be rotated, and the inside edge 58 of the paper will be supplied with a coating of adhesive. A cap 59 may be supplied to afford access to the chamber 44. The coated edge 58 of the paper overlies the preceding spiral, as appears from Fig. 2, and serves to firmly unite successive turns together.

It will be understood that changes in the mechanical details may be made without departing from the spirit of my invention as set forth in the appended claims.

I claim:

1. In a wrapping machine of the type wherein the paper is carried around the article in successive spirals by a rotating shuttle, a glue applying device carried by said shuttle and adapted to apply glue to the paper said device being positively actuated by the withdrawal of paper from the shuttle.

2. In a wrapping machine of the type wherein the paper is carried around the article in successive spirals by a rotating shuttle, a paper guide mounted on the shuttle and chambered to provide a receptacle for adhesive, and a glue roll mounted in said guide to connect the receptacle with the surface of the guide.

3. In a wrapping machine of the type wherein the paper is carried around the article in successive spirals by a rotating shuttle a paper guide mounted on the shuttle and chambered to provide a receptacle for adhesive, a glue roll mounted in said guide to connect the chamber with the surface of the guide, and means for rotating the glue roll.

4. In a wrapping machine of the type wherein the paper is carried around the article in successive spirals by a rotating shuttle, a paper guide mounted on the shuttle and chambered to provide a receptacle for adhesive, a glue roll mounted in said guide to connect the chamber with the surface of the guide, a paper supplying roll, and means for driving the glue roll from the paper supplying roll.

5. In a wrapping machine of the type wherein the paper is carried around the article in successive spirals by a rotating shuttle, a paper guide mounted on the shuttle and chambered to provide a receptacle for adhesive, and a glue roll mounted in said guide to connect the receptacle with the surface of the guide, a paper supplying roll, an intermediate shaft, a chain connection between the paper supplying roll and the intermediate shaft and a chain connection between the glue roll and the intermediate shaft.

6. A wrapping machine for annular articles comprising a rotatable shuttle, a paper supply carried by the shuttle, a glue applying device constructed and arranged to apply glue to the paper, and a glue supply constructed and arranged to supply glue to the applying device, the applying device being positively driven in a fixed relation to the movement of the paper.

JOHN H. ROBERTS.